United States Patent [19]

Cayzer et al.

[11] 3,912,805
[45] Oct. 14, 1975

[54] REAGENT AND ASSAY FOR HUMAN FIBRINOGEN DEGRADATION PRODUCTS

[75] Inventors: Ian Cayzer, Westerham; Pamela Mary Pitcher, Addington, both of England

[73] Assignee: Burroughs Wellcome Co., Research Triangle Park, N.C.

[22] Filed: Nov. 15, 1974

[21] Appl. No.: 524,122

Related U.S. Application Data

[63] Continuation of Ser. No. 160,500, July 7, 1971, abandoned.

[30] Foreign Application Priority Data

July 17, 1970 United Kingdom............... 34899/70

[52] U.S. Cl............ 424/12; 195/103.5; 260/112 R; 260/112.5; 424/78; 424/101
[51] Int. Cl.$^2$................ A23J 1/06; A61K 31/74; G01N 31/00; G01N 33/16

[58] Field of Search............... 424/8, 12, 101

[56] References Cited
OTHER PUBLICATIONS

Merskeg, Blood, The J. of Hematology, Vol. 28, No. 1, July 1966, pp. 1–18.

Primary Examiner—Albert T. Meyers
Assistant Examiner—A. P. Fagelson
Attorney, Agent, or Firm—DeLio and Montgomery

[57] ABSTRACT

A biological reagent in the form of inert particles sensitised with antibodies raised against fibrinogen degradation products, method of preparing inert particles sensitised with antibodies raised against fibrinogen degradation products and method of performing an assay of human fibrinogen degradation products using inert particles sensitised with antibodies raised against fibrinogen degradation products.

10 Claims, No Drawings

REAGENT AND ASSAY FOR HUMAN FIBRINOGEN DEGRADATION PRODUCTS

This is a continuation of application Ser. No. 160,500, filed July 7, 1971, now abandoned.

This invention relates to a reagent for estimating the level of fibrinogen degradation products in serum, and to a method of preparing such a reagent.

Fibrinogen degradation products (FDP) are normally present in the blood as the result of the enzymatic action responsible for the digestion of unwanted fibrin after blood coagulation. The level of FDP in the blood is becoming of increasing interest in connection with the problems associated with blood coagulation and fibrinolysis. Abnormal coagulation of the blood is characterized by a high level of FDP in the circulating plasma, and thus the latter provides an early indication of thrombotic episodes such as those that may follow surgical interference or be associated with myocardial infarction.

The technique available at present for the estimation of FDP is based on a haemagglutination inhibition assay; it utilises tanned red cells sensitised with fibrinogen and agglutinated with an antiserum to the fibrinogen. This type of assay, although accurate, requires specialised apparatus and a high standard of technical ability, in addition to the fact that it is time-consuming, a period of approximately three hours being required for its performance. Thus the haemagglutination inhibition assay is suitable for research purposes, but is of limited use for routine investigations of clinical problems. In the clinical field, the ultimate in accuracy can profitably be sacrificed for rapidity and ease of performance of a test for FDP.

Attempts have been made to develop a more rapid assay for FDP using a latex reagent sensitised with antibodies to fibrinogen, but, while this reagent was very sensitive to fibrinogen it proved to be unsatisfactory for measuring the degradation products. Thus there is a need for a test that is rapid and easy to perform yet still sensitive and thus suitable for routine clinical use in measuring fibrinogen degradation products.

It has now been found possible to raise an antiserum against human FDP and this enables one to prepare a reagent comprising a suspension of inert particles sensitised with antibodies to human fibrinogen degradation products, which reagent can be used in a sensitive, direct agglutination assay for human FDP.

The particular value of an agglutination assay is that it can render visible to the naked eye, the reaction of antigen with antibody. Normally such a reaction is not visible to the naked eye because of the very small size of antibodies and antigens, however, this problem can be overcome by the use of inert particles, which are visible to the naked eye, though not necessarily as discrete entities, in a manner as described hereinafter: a suspension of inert particles is sensitised with antigen or antibody; this is achieved by mixing a suspension of adsorbent inert particles with a solution of the antigen or antibody which is adsorbed onto the surface of the particles thereby coating the particles. The suspension of inert particles sensitised with the antigen or antibody may then be used to test for corresponding antibody or antigen in a test solution, by mixing the suspension with the test solution for a few minutes on an impermeable surface. If the antigen or antibody in the test solution corresponds to the antibody or antigen in the suspension, then these will react and become attached to one another. In practice a given antigen or antibody molecule becomes attached to several antibody or antigen molecules, respectively, hence one molecule of antigen or antibody in the solution becomes attached to several of the sensitised particles thus leading to clumping or agglutination which is clearly visible to the naked eye. Any conventional adsorbent inert particles, that are known to be used in an agglutination assay, may be used in the reagent of the present invention. Thus the inert particles may be bacteria or suitably treated red cells, particles of silica, or bentonite, charcoal, alumina, kaolin or polyacrylic acid polymers, although particles of polystyrene latex are particularly preferred from the point of view of general preparative convenience and quality of the reagent. The most usual range of particle size is from 0.01 to 1$\mu$ in diameter; although particles with a diameter greater than 1$\mu$ are feasible, their reaction, when coated with the antiserum, with FDP is rather unsatisfactory and tends to be slow. The concentration of the particles in aqueous suspension is conveniently between 0.2 and 5% (w/v) although most preferably from 0.4 to 1% (w/v).

The antibodies with which the inert particles are coated may be raised against a mixture of human FDP, and consequently the suspension containing such particles of polyvalent, that is, it will react with any one of several human FDP. Alternatively the antibodies may be raised against an individual purified FDP thus providing a suspension which reacts specifically with the individual FDP.

The optimal concentration of antibody in the reagent may be readily determined by trial and error as follows: a number of samples of a suspension of the inert particles are sensitised with different amounts of antibody, in a manner as described hereinbelow, so as to produce a number of reagent samples wherein the concentration of inert particles is constant and the concentration of antibody is variable. If the antibody concentration is too low, the reagent is found to be susceptible to spontaneous non-specific agglutination. If the antibody concentration is too high, then the reagent is found to be insensitive. The optimal concentration of antibody lies between the two extremes and is that concentration of antibody which is present in a reagent sample that just agglutinates in the presence of a desired level of FDP. The desired level of FDP may be anywhere between 1 and 50 $\mu$g/ml, although a reagent prepared so as to just agglutinate in the presence of about 3 $\mu$g/ml of FDP is particularly valuable, as this is the level of FDP in normal blood; hence abnormal levels of FDP may be determined particularly conveniently with such a reagent. The antibodies are raised by injection of human FDP into a mammal other than man. The mammal may be of any species commonly used for antibody production, for example, horse, sheep, rabbit, goat, guinea pig or rat. Injection may be carried out in accordance with any immunisation schedule suitable for raising antibodies.

The FDP which is injected into the mammal may be conveniently obtained by the digestion of fibrinogen or fibrin with a proteolytic enzyme: the enzyme plasmin is preferred because of its limited specific activity with fibrinogen or fibrin. The source of the fibrinogen or fibrin and the proteolytic enzyme may be any appropriate species of animal, but in view of the clinical importance of the product, the origin of the materials is desirably human, in most instances. The digestion is preferably effected by incubation of the fibrinogen or fibrin, with the enzyme, at room temperature for 12 to 36 hours, to ensure adequate degradation. The mixture resulting from the proteolytic digestion includes fibrinolytic products, enzymes and enzyme activators, and may be used as such to raise an antiserum, but preferably it is purified by removal of material not originating from fibrinogen or fibrin. Purification may be effected by any suitable method known in the art, for example, by gel filtration or electrophoresis. If it is so desired the purified FDP may then be fractionated so that more specific antisera may be raised. Fractionation may be effected by any suitable method known in the art, for example, by agar gel electrophoresis or by gel filtration, conveniently using Sephadex (Registered Trade Mark).

The unpurified FDP, purified FDP or individual FDP fraction is then brought to the desired concentration and rendered isotonic with blood of the mammal into which it may then be injected, optionally with an adjuvant. Any of the usual adjuvants may be used although Freund's complete adjuvant is particularly convenient. This particular adjuvant consists of an aqueous emulsion of heat killed bacteria in paraffin oil.

When an antiserum of sufficiently high antibody titre is raised, blood is removed from the mammal, the blood is allowed to clot and antiserum is collected. Advantageously the antiserum is then fractionated by conventional methods, for example, the serum may be decomplemented to prevent interference by the complement with the use of the reagent in tests for human FDP. Further, the immunoglobulin G fraction, which comprises primarily antibodies, may be isolated. Further still, the immunoglobulin G fraction may be fractionated by immunoabsorption techniques, so as to yield a fraction comprising antibodies to all the FDP which have been injected into the mammal or a fraction comprising antibodies to only one of these FDP.

It will be apparent to one skilled in the art that the specificity and sensitivity of a reagent, wherein the particles have been sensitised with antibodies of FDP alone, will be considerably enhanced with respect to a reagent wherein the particles have been sensitised with unfractionated antiserum, although the extra cost of the fraction may not always be warranted. Accordingly it should be understood herein that the sensitisation of inert particles with antibodies, raised in a mammal other than man, against FDP, may be effected with the antiserum of any antibody fraction thereof as described in the immediately preceding paragraph.

The biological reagent may be prepared by any conventional method for the preparation of a reagent suitable for use in an agglutination assay. Conveniently the reagent is prepared by mixing a solution containing antiserum or an antibody fraction thereof as described hereinbefore, with a suspension of inert particles as described hereinbefore, and optionally with a buffer, so as to produce a reagent as described hereinbefore. Optimum conditions for mixing may be readily determined by trial and error. In general it has been found that it is desirable, though not essential, to heat the reagent and that optimally the pH of the buffer is from 6 to 9. In the case of a reagent wherein the inert particles are of polystyrene latex it has been found that advantageously heating is at a temperature of from 20° to 80°C for a length of time dependent on the temperature chosen, for example, for 15 to 30 minutes at 50° to 70°C.

The addition of serum albumin from blood of any convenient mammal, is advantageous for increasing the stability of the reagent, although the stability of the reagent and its sensitivity in subsequent test procedures, are primarily dependent on use of the optimal sensitising amount of antibody in the reagent. Sodium azide may also be added to the reagent to increase its stability and the reagent is desirably stored at about 4°C.

The reagent of the present invention is highly sensitive to the presence of FDP and in their presence agglutinates rapidly by virtue of the antibody binding sites present on the particle surfaces. Thus the reagent can be used in a simple test system, the specificity of the test being dependent on the specificity of the antibody used to sensitise the particles. The specificity of the antibody depends in turn on the procedures by which it is isolated and the antigen against which it is raised.

A test for the presence of FDP utilising the reagent may be performed conveniently by mixing a few drops of the reagent, with a small volume of a sample serum, on an impermeable surface. As used herein an impermeable surface includes a slide, a tile, a plate, the inside of a test tube, a well, and a suitably treated card. The impermeable surface may be of any impermeable material although glass and ceramic materials are particularly convenient. Advantageously the impermeable surface is of a colour or in the case of a clear glass surface is used against a background of colour, which colour contrasts with the colour of the inert particles used in the reagent; since this enables the behaviour of the reagent to be observed more readily.

If FDP are present in a sufficient concentration, that is in a concentration in excess of the desired level as defined hereinbefore, the most usual being a concentration in excess of 3 $\mu$g/ml; the sensitised particles are agglutinated within a few minutes, and the liquid mixture changes from a uniformly opalescent texture to show clumps of agglutinated particles visible to the naked eye. Such a test is sufficiently sensitive to detect FDP at the concentrations normally found in human serum, and the high concentrations associated with abnormal clotting conditions are measured by testing suitably diluted samples of the serum. Samples of serum can be obtained within about 30 minutes of venipuncture, and positive reactions can be detected within as little as 2 minutes of mixing the reactants.

In addition, the reagent of the present invention may be used in an agglutination assay for fibrinogen, in the same way as conventional reagents comprising inert particles sensitised with antibodies to fibrinogen or fibrin.

The reagent of the present invention may conveniently be presented in a test kit which comprises a container of the reagent and instructions for using the test kit in an agglutination assay of fibrinogen degradation products. Desirably the test kit also contains a container of a buffer; a control sample and collection tubes for blood samples, said tubes containing thrombin and optionally a protease inhibitor. Conveniently the test kit may also contain a mixing rod; droppers and an impermeable mixing plate.

The buffer is used as a diluent for the serum to which it is added prior to mixing with the reagent. The buffer also helps to maintain an optimum pH, generally from pH 6 to pH 9, at which pH agglutination takes place most readily. Conveniently a glycine-saline buffer is used although any suitable buffer known in the art may be used. Advantageously the test kit may also include a container of a control solution which contains an amount of FDP which corresponds to the level found in abnormal blood. The collection tubes for collecting blood samples in, contain thrombin to clot fibrinogen and a protease inhibitor. Clotting of the fibrinogen renders it insoluble and thus serum may be readily separated from it thereby eliminating the possible reaction of the reagent with fibrinogen. The use of a protease inhibitor prevents enzymic degradation by plasmin of fibrinogen or fibrin, thereby creating additional fibrinogen degradation products and so leading to a false high level of them.

Accordingly the present invention provides a biological reagent for use in detecting human fibrinogen degradation products comprising a suspension of inert particles sensitised with antibodies raised, against human fibrinogen degradation products, in a mammal other than man.

In a further aspect of the present invention provides a method of preparing a biological reagent for use in the detection of human fibrinogen degration products comprising sensitisation of inert particles with antibodies raised against human fibrinogen degradation products.

In a yet further aspect the present invention provides a method of making a test kit suitable for the assay of human fibrinogen degradation products comprising the assembly of a kit of four vessels; one vessel containing an aqueous suspension of adsorbent inert particles sensitised with antibodies raised, in a mammal other than man against human fibrinogen degradation products; a second vessel containing a buffer; a third vessel containing a control sample and a fourth vessel, for use as a collection tube, containing thrombin and a protease inhibitor.

In order that the invention may be more fully understood, the following examples are given, purley by way of illustration:

Example 1

Preparation of an antibody sensitised suspension of inert particles

25 CU of human plasminogen in aqueous solution were mixed with 1250 units of streptokinase solution, and incubated for one hour at room temperature to effect the conversion of the plasminogen to plasmin. The plasmin preparation was added to a solution of 50 mg of human fibrinogen in 20 ml of citrate buffer, pH 6.4, and the resultant mixture incubated at room temperature for 24 hours. The enzymic activity was inhibited by the addition of 100 units Trasylol (Registered Trade Mark) per ml. of solution, and the residual fibrinogen was clotted with thrombin (10 units/ml. of solution) and then removed by centrifugation.

The clear supernatant was tested by immunoelectrophoresis in 1% agarose gel for the presence of degration products and the absence of whole fibrinogen, before being concentrated by pressure dialysis. Then the two major fragments of FDP, fragments D and E, were separated by electrophoresis in agarose gel at pH 8.5; the solution of antigen was warmed to 52°C before being mixed with agarose before application to the gel, and the electrophoresis was effected for approximately 20 hours at 150V. The fragments were localised by removing plugs of the gel and testing them for the presence of antigen in an immunoelectrophoresis system, using rabbit antifibrinogen serum. The area of the gel containing one degradation fragment was homogenised in a small volume of saline, and the homogenate was suitable for subsequent use in raising an antiserum.

1 ml of the homogenate of antigen-containing agarose thus prepared was emulsified in 3 ml of Freund's complete adjuvant and injected intramuscularly into all four limbs of a rabbit. The injection was repeated at monthly intervals for three months, after which time the antiserum was of suitable agglutination titre when tested against red cells sensitised with fibrinogen; the rabbit was then bled out and the serum collected.

Antibodies to proteins other than FDP were removed from the rabbit serum by mixing the crude antiserum with an insoluble polymer of normal human serum with negative FDP levels, and allowing absorption to occur for about 1 hour at 37°C. The polymer was prepared by reacting 20 ml human serum containing 2 ml 1.0M acetate buffer, pH 4,4, with 6 ml of 2.5% (w/v) glutaraldelyde, and allowing gelling to occur at room temperature; after 3 hours, the polymer was washed thoroughly in buffer and sucked dry before use. After absorption, the antiserum which has been rendered monospecific for one fragment of the FDP was decanted off from the polymer.

10 ml of the antiserum thus prepared were adjusted to pH 8.5, and 30 ml of 0.4% (w/v) 2-ethoxy-6, 9-diaminoacridine lactate in distilled water were added with gentle stirring. The precipitate was removed by centrifugation and 50 mg of activated animal charcoal were added to the supernatant. The mixture was shaken, left to stand for 1 hour and then filtered. The filtrate was stirred gently during the addition of an equal volume of saturated ammonium sulphate solution, and the mixture left to stand for several hours at 4°C. The precipitate was redissolved in 4 ml of isotonic saline and dialysed against several changes of saline to remove all traces of ammonium sulphate. Then the mixture was dialysed against 0.1M gylcine saline buffer, pH 8.2, for a few hours.

The protein concentration of the resultant globulin solution was estimated from its optical density at 280 mu, which was measured in a spectrophotometer.

An aqueous 40% (w/v) suspension of polystyrene latex particles was diluted to 1% (w/v) with 0.1 M glycine saline buffer, pH 8.2. The globulin solution prepared as described above was diluted to a concentration of 2 mg/ml of protein, and 0.4 ml of the diluted protein solution was mixed with 0.4 ml of the 1% (w/v) latex suspension and 0.2 ml of the buffer.

The suspension was heated in a water bath for 20 minutes at 60°C to coagulate the particles. 0.05 ml of a solution of 1% (w/v) bovine serum albumin was added to the suspension, which was then violently shaken and reheated for 10 minutes to stabilise the reagent.

The sensitised latex suspension was tested against a solution of the pure fragment, as prepared in a manner as described hereinbefore; the latex preparation just agglutinated in the presence of 3 µg fragment/ml.

Two standard dilutions (1:15 and 1:50) of the unknown serum sample were prepared in 0.1 M glycine saline buffer, pH 8.2, and one drop of each solution and one drop of the buffer were placed on a clear glass slide. To each of the three drops was added one drop of the sensitised latex suspension prepared as described above. After mixing and spreading the liquid out to form small pools, the slide was rocked gently for two minutes, and the samples were then examined for signs of agglutination.

Agglutination was absent in the serum dilution of 1:50 but present in the serum dilution of 1:5. Thus, the concentration of FDP in the undiluted serum was between 15 and 150 $\mu$g/ml. and therefore the level of FDP in the unknown serum was raised above normal.

Example 2

Preparation of an antibody sensitised suspension of red blood cells

An aqueous suspension containing 4% w/v of treated sheep red blood cells in phosphate-citrate buffer (0.15M Phosphate, 0.1M citrate; pH 6.4), was prepared in accordance with the method of Merskey et al (Proc. Soc. Exp. Biol. & Med., 131 p871 (1969).

Equal volumes of the aqueous suspension and whole antiserum, prepared as in Example 1 and diluted to a concentration of 80 mg/ml of protein, were mixed and incubated at 37°C for 60 minutes. The resulting suspension of sensitised cells was washed 4 times in phosphatecitrate buffer (0.15M Phosphate, 0.1M citrate; pH 6.4) and resuspended to a concentration of 4% w/v of cells in the phosphate-citrate buffer.

The suspension of sensitised cells was tested against a solution of unfractionated human F.D.P., prepared as in Example 1; the suspension just agglutinated in the presence of 2 mg/ml of the human F.D.P. The suspension of sensitised cells was also tested against fibrinogen; the suspension just agglutinated in the presence of 1 mg/ml of fibrinogen.

Example 3

Preparation of a test kit

An aqueous suspension of antibody sensitised particles of polystyrene latex prepared as in example 1 was introduced into a vessel. The vessel containing the suspension was then assembled into a kit with three other vessels: one vessel containing a glycine-saline buffer (0.1M, pH 8.2), a second vessel containing an aqueous suspension of human fibrinogen degradation products (10$\mu$g/ml) for use as a control sample, and a third vessel (for use as a collection tube) containing thrombin and a protease inhibitor; a graduated dropper with a rubber teat; a glass slide; disposable mixing rods; disposable droppers provided with rubber teats; and a set of instructions containing inter alia the following directions:

"Instructions for use of a test kit"

1. Take blood into a dry syringe by clean venipuncture without venous stasis. Transfer 2 ml. of blood to the collection tube provided and mix immediately and thoroughly by repeated inversion; the collection tube contains thrombin and an enzyme inhibitor to prevent breakdown of fibrin to F.D.P; the blood will clot within a few seconds of its being put into the tube.
2. "Ring" the clot to allow retraction and allow the tube to stand (at 37°C if possible) until clear serum can be seen at the top of the sample.
3. Prepare dilutions of serum samples. Take two small glass or plastic tubes and mark them 1 and 2. Place 0.5 ml. of glycine buffer in each tube; use the graduated dropper provided with the bottle of buffer.
4. Using a disposable dropper with the teat provided, aspirate clear serum from the sample tube and add 3 drops to tube 1. Return the remainder of the serum to the sample tube. Mix the buffer and serum (now at approximately 1:5 dilution) by repeated aspiration into the same disposable pipette, taking care that the liquid does not rise into the teat. When mixed, place a single drop of the diluted serum on position 1 of the glass slide and then transfer a further three drops to the buffer in tube 2. Return the remainder of the 1:5 dilution to tube 1.
5. Mix the new dilution (approximately 1:50) in tube 2 by repeated aspiration into the same dropper and then place a single drop on position 2 of the glass slide.
6. Mix the latex suspension by shaking the tube vigorously for a few moments and then add 1 drop of the suspension to each of the serum dilutions on the glass slide.
7. Stir each of the serum/latex mixtures with one of the Disposable mixing rods. Start with the mixture in position 2, spreading it so as to cover the area within the circle on the glass slide, then repeat with the mixture in position 1.
8. Rock the slide gently to and fro for a maximum of 2 minutes while looking for macroscopic agglutination. This can be seen most clearly when the slide is viewed against a distant, dark background (if the test is carried out at a bench next to a window the floor beneath the bench will act as a contrast to the latex pattern on the slide).

As with all slide agglutination reactions, the results are best viewed in bright, diffuse daylight, but the patterns obtained with the test kit are extremely clear cut and can be easily recognised under any normal conditions of lighting.

Controls

The reagent has excellent stability and it is not normally necessary to include known positive or negative control sera in each batch of tests. When an interval of several days or weeks has occurred since the last test, however, it is a wise precaution to ensure the proper functioning of the system by testing the latex suspension with the positive control serum supplied with the kit. This has been prepared as a 1:5 dilution of a serum containing approximately 50 $\mu$g/ml of FDP. For the proper control of the test, therefore, the control serum should be tested as supplied and at a further dilution 1:10 (equivalent to the 1:5 and 1:50 dilutions of sera normally tested). To prepare a 1:10 dilution, place 0.25 ml of glycine buffer in a small tube and add one drop of the positive control serum. Mix the dilution and then place one drop in position 2 on the glass slide; in position 1 of the slide, place one drop of the control serum as supplied. Proceed thereafter as from step 6 above. Under these circumstances, the test in position 1 should show agglutination while that in position 2 should not.

Interpretation of results

An agglutinated pattern in either position on the glass slide indicates the presence of FDP at a concentration greater than 3 $\mu$g/ml in the serum dilution in that position. Since the dilutions in position 1 and position 2 are 1:5 and 1:50 respectively, a positive result in position 1 indicates that FDP was present in the original serum at a concentration in excess of 15 µg/ml while agglutination in position 2 indicates the original concentration to have been greater than 150 µg/ml.

Note If agglutination is present in position 2, it must also be present in position 1; if this should not be the case, the test has not been performed correctly.

What we claim is:

1. An immunological diagnostic reagent suitable for use in the assay of human fibrinogen degradation products, comprising adsorbent inert particles having a diameter of 0.1 to 1 micron sensitised with an antiserum comprising antibodies raised, in a mammal other than man, against at least one of the two major fragments of said human fibrinogen degradation products;

wherein the fibrinogen degradation products, against which said antibodies are raised, are obtained from the digestion of human fibrinogen or fibrin with a proteolytic enzyme and purification of the composition resulting from the digestion to provide at least one of the two major fragments of said human fibrinogen degradation products.

2. The reagent of claim 1 in which the inert particles are of polystyrene latex.

3. The reagent of claim 1 in which the sensitised inert particles are presented as an aqueous suspension.

4. The reagent of claim 3 in which the concentration of the inert particles in the aqueous suspension is 0.2 to 5% w/v.

5. The reagent of claim 3 in which the concentration of the inert particles in the aqueous suspension is 0.4 to 1% w/v.

6. A method of assay of human fibrinogen degradation products, comprising the steps of: placing on an impermeable surface a sample of human serum free from fibrinogen; forming a mixture of said sample and the reagent of claim 1; and visually observing said mixture for signs of agglutination.

7. A method of assay of human fibrinogen degradation products comprising the steps of: removing a sample of blood from a human patient; introducing the blood into a collection tube containing thrombin and a protease inhibitor and rapidly mixing the contents; allowing said collection tube and its contents to stand until clear serum separates; placing a serum sample from said collection tube on an impermeable surface; forming a mixture of said sample and an aqueous suspension containing the diagnostic reagent of claim 1; and visually observing said mixture for signs of agglutination.

8. The reagent of claim 1 wherein said purified composition is fractionated to provide one of said two major fragments of said human fibrinogen degradation products, and said antibodies are raised against said one major fragment.

9. A method of assay of human fibrinogen degradation products, comprising the steps of: placing on an impermeable surface a sample of human serum free from fibrinogen; forming a mixture of said sample and the reagent of claim 8; and visually observing said mixture for signs of agglutination.

10. An immunological diagnostic reagent suitable for use in the assay of human fibrinogen degradation products, comprising adsorbent inert particles having a diameter of 0.1 to 1 micron sensitised with an antiserum comprising antibodies raised, in a mammal other than man, against at least one of said human fibrinogen degradation products;

wherein the fibrinogen degradation products, against which said antibodies are raised, are obtained from the digestion of human fibrinogen or fibrin with a proteolytic enzyme and purification of the composition resulting from the digestion to provide at least one of fragments D and E.

* * * * *